July 18, 1972   G. F. RITTER, JR   3,677,733
GLASS SHEET BENDING AND TEMPERING APPARATUS
Filed Sept. 5, 1969   4 Sheets-Sheet 1

INVENTOR.
George F. Ritter Jr.
BY
Collins & Oberlin
ATTORNEYS

July 18, 1972   G. F. RITTER. JR   3,677,733
GLASS SHEET BENDING AND TEMPERING APPARATUS
Filed Sept 5, 1969   4 Sheets-Sheet 2

INVENTOR.
George F. Ritter Jr.
BY Collins & Oberlin
ATTORNEYS

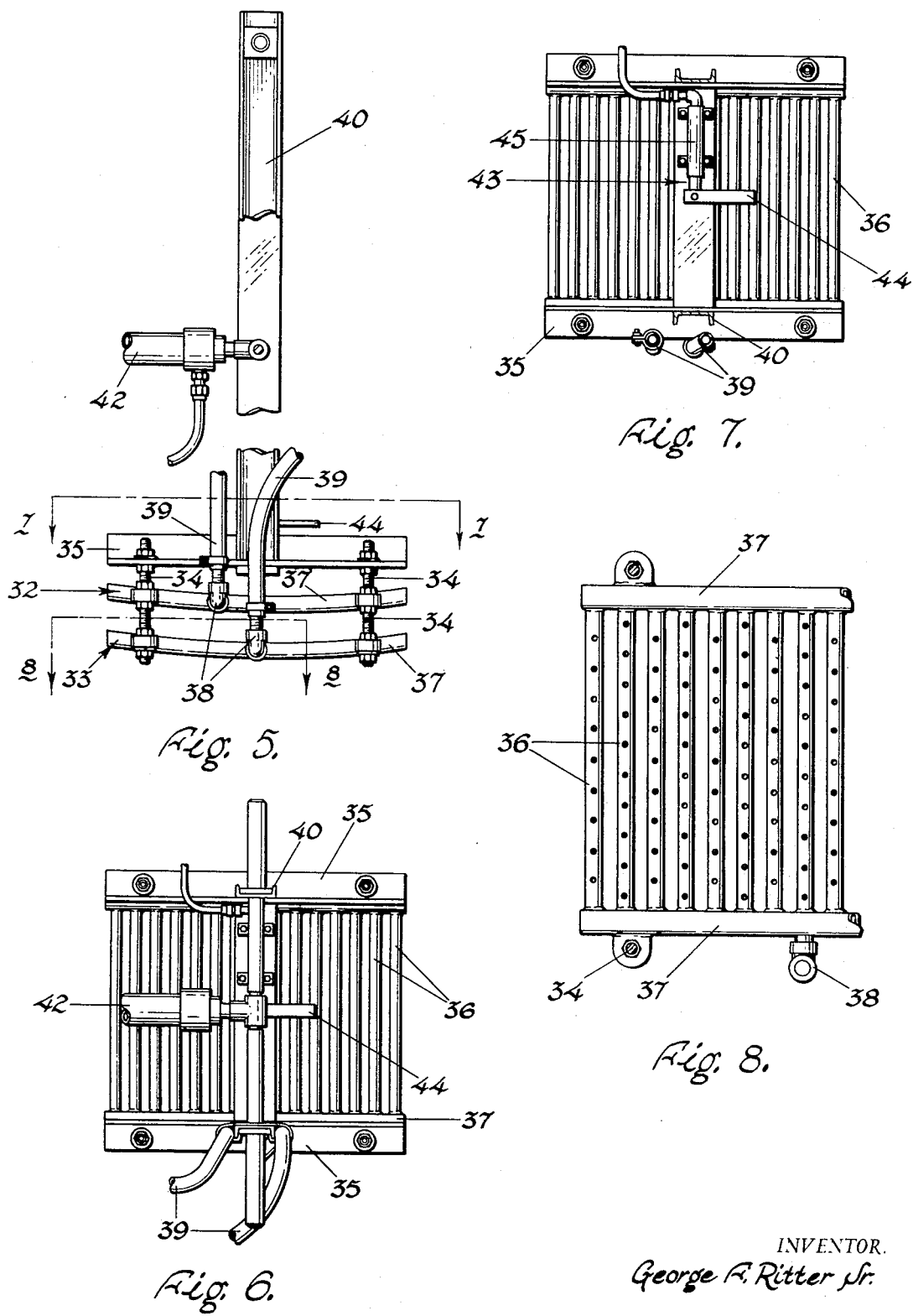

United States Patent Office 3,677,733
Patented July 18, 1972

3,677,733
GLASS SHEET BENDING AND TEMPERING APPARATUS
George F. Ritter, Jr., Toledo, Ohio, assignor to Libbey-Owens-Ford Company, Toledo, Ohio
Filed Sept. 5, 1969, Ser. No. 855,559
Int. Cl. C03b 23/02
U.S. Cl. 65—268
3 Claims

ABSTRACT OF THE DISCLOSURE

A bending and tampering apparatus particularly adapted for treating thin glass sheets. The bending apparatus is of the inertia-gravity type and utilizes a cantilever mounted shaping rail. Upper and lower cooling blastheads are swung over the unsupported end of the shaping rail to apply tempering air immediately after bending, before excessive heat is lost by the thin glass.

---

The present invention relates to the production of curved glass sheets and more particularly to improved apparatus for bending and tempering glass sheets.

Curved sheets of glass are widely used as glazing closures for vehicles, such as automobiles or the like. To be suitable for such application, the curved sheets must be bent to precisely defined curvatures as dictated by the over-all styling of the vehicle and the manner of mounting the sheet in the opening. At the same time, it is important that the sheets meet rather stringent opical requiremens and more particularly that the viewing area of the window or light be free of optical defects which would tend to interfere with the clear viewing of an object through the window. Further, glass sheets intended for use as glazing closures in vehicles, and particularly those intended for use as sidelights and backlights are subjected to a tempering process whereby the outer surface of the sheet is placed under compression and the interior under tension, thereby increasing its strength and resistance to surface damage.

In general, the commercial production of curved glass sheets of the above character includes heating the sheets to the softening point of the glass, bending the heated sheets to the desired curvature and thereafter rapidly cooling the sheets to a temperature below the annealing range of the glass.

One particularly successful procedure for producing such bent sheets is the so-called inertia-gravity process, which is described in detail in U.S. Pat. No. 3,476,540, issued to George F. Ritter, Jr. et al. on Nov. 4, 1969. According to this process the heat-softened sheets are positioned over a bending mold member and the mold and sheet are then accelerated rapidly in the direction opposite the desired direction of bending of the sheet whereby an inertial force is exerted against the sheet forcing it into registry with the shaping surface of the mold. Where the bending mold is oriented horizontally, of course, gravity forces also enter into the bending of the sheet.

The simplicity of the inertia-gravity process has made it particularly attractive as a means for producing thin bent and tempered glass sheets, for example, ⅛ in. thick and less. One of the most vexing problems involved with bending and tempering such thin sheets is the need for cooling the sheets very rapidly after bending since the thin sheets tend to cool so fast. It is thus highly desirable to temper the sheets while they are still within the confines of the bending apparatus; however, this has not proved to be practical with the usual form of press bending apparatus because the rather complex apparatus does not leave room for tempering blastheads of the size necessary for the rapid cooling of thin sheets.

Accordingly, it is a primary object of the present invention to provide a bending and tempering apparatus in which a large volume of cooling air can be applied to the sheet immediately after it is bent.

Another object of the invention is to provide a bending and tempering apparatus of the inertia-gravity type utilizing a mold member which is adapted to receive tempering blastheads above and below its shaping surface to simultaneously apply tempering air to both major surfaces of the sheet while the sheet is still supported on the shaping surface of the mold.

Another object of the invention is to provide a bending apparatus as described above utilizing an outline-type bending mold which leaves all but the marginal edge portions of the sheets open to exposure to the tempering air.

What this invention proposes as a means to meet these objectives is an inertia-gravity type bending apparatus in which the mold member is cantilever mounted, leaving an open end over which a tempering blasthead assembly is swung or otherwise moved into place as soon as the sheet is bent.

Other objects and advantages of the invention will become more apparent during the course of the following description when taken in connection with the accompanying drawings.

In the drawings, wherein like numerals are employed to to designate like parts throughout the same:

FIG. 5 is an enlarged detail elevation view of the tempering apparatus;

FIG. 6 is a plan view of the tempering apparatus;

FIG. 7 is a sectional view taken at line 7—7 of FIG. 5;

FIG. 8 is a partial sectional view taken at line 8—8 of FIG. 5;

Figure 1:
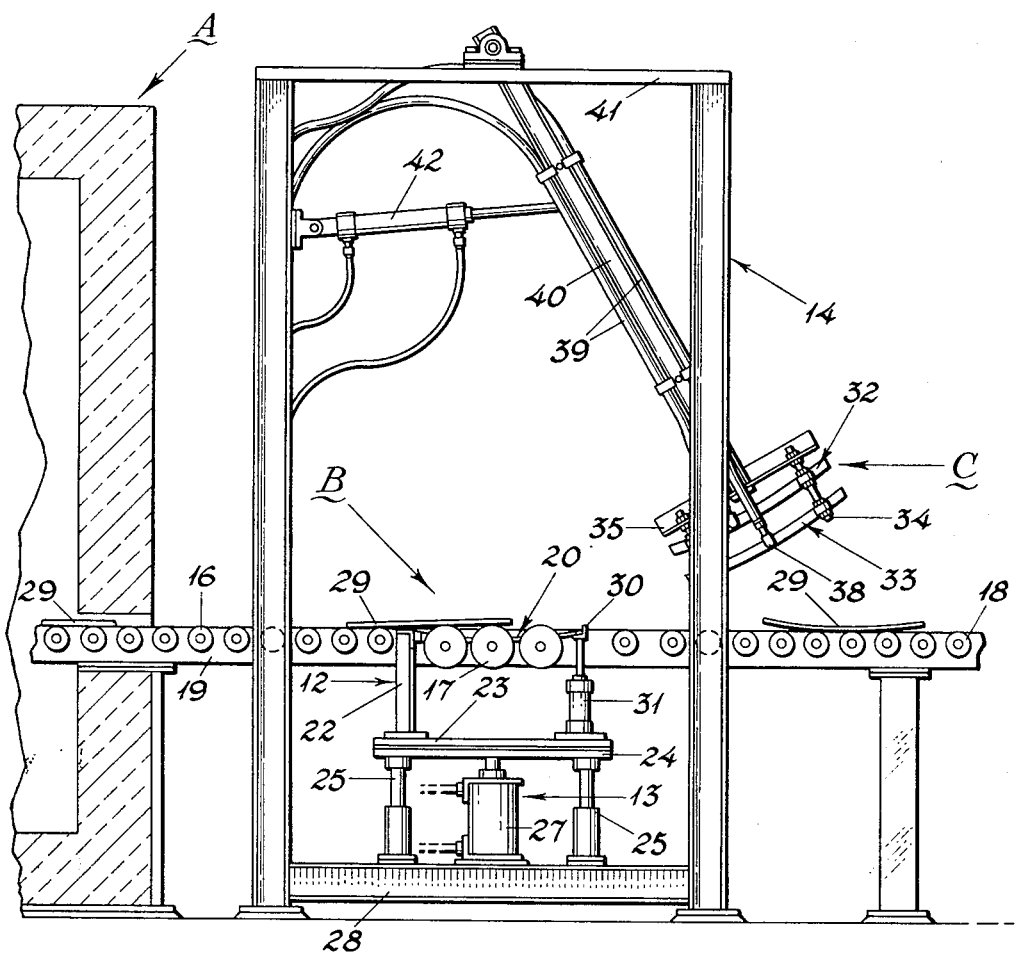
FIG. 1 is a side elevation view of a bending and tempering apparatus constructed in accordance with the present invention.

Referring to the drawings, there is illustrated a glass bending and tempering apparatus in which sheets of glass, heated to the softening point in a furnace section A, are transferred to a bending apparatus B where they are bent by inertial and gravitational forces, and then are rapidly cooled by means of a tempering section C which is movable into position to temper the sheets while they are still supported in the bending section.

The bending section consists essentially of a movable mold member 12 and an actuating device 13 capable of producing the required acceleration, both suitably mounted within a rigid framework 14, and a conveyor system comprising entry conveyor rolls 16, bending section rolls 17, and exit rolls 18, mounted on rail sections 19 running along either side of the framework 14.

Figure 2:
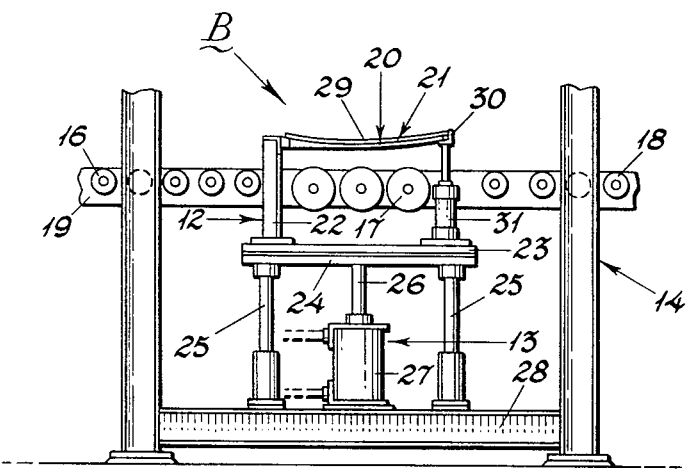
FIG. 2 is a fragmentary elevation view of the bending apparatus depicting the sheet after it has been accelerated and bent into conformity with the mold.
Figure 9:
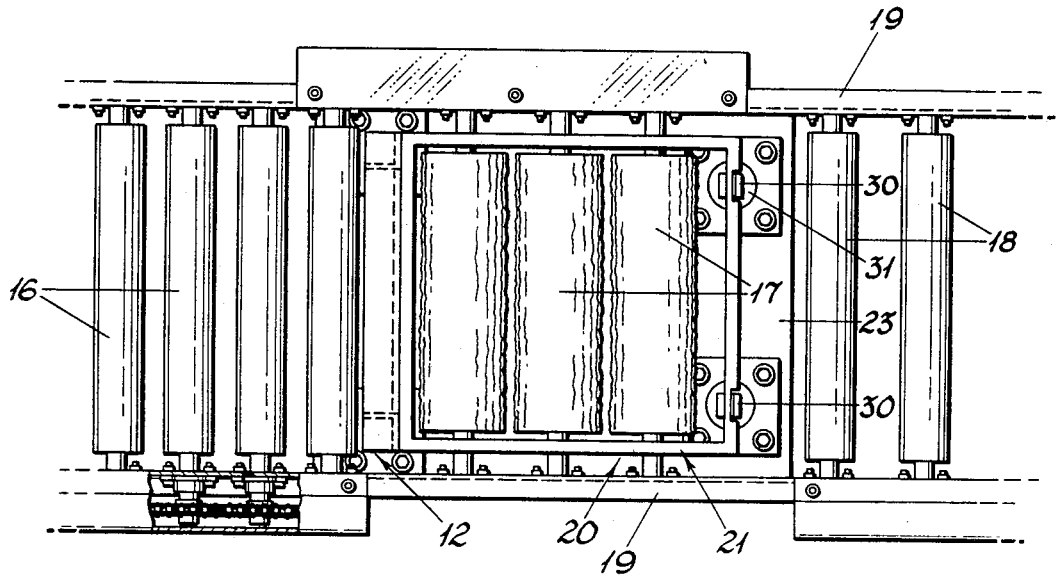
FIG. 9 is a plan view of the bending apparatus.
Figure 10:
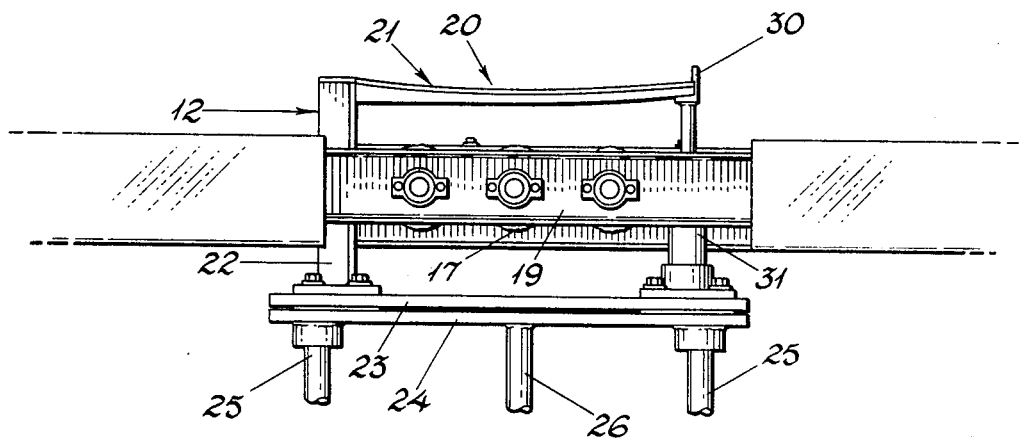
FIG. 10 is an enlarged elevation view illustrating the relationship between the bending mold and the supporting conveyor rolls.

Referring more specifically to FIGS. 2 and 9, the bending mold member 12 comprises an outline, or ring-type shaping element 20 having a contoured shaping surface 21 formed on its upper face, and is cantilever mounted on a vertical support 22. The vertical support is in turn bolted or otherwise mounted to a horizontal base plate 23 mounted on a carriage 24. The carriage 24 is supported by telescoping guide members 25 which allow vertical movement only, said vertical movement being provided by the ram 26, of a pressure cylinder 27, which bears against the bottom of the carriage. The cylinder 27 and guide member 25 are supported by a crossmember 28 which is part of the framework 14.

As each sheet 29 enters the bending section B from the furnace section A it is halted above the mold member 12 in position to be bent thereby. Although the sheet can be positioned by simply stopping the conveyor at the right moment, either manually or through the use of photoelectric or other detection devices, the illustrative embodiment includes positive mechanical stops 30. The stops 30 are moved into and out of the path of sheet movement by pressure cylinders 31 mounted on the base plate 23.

Figure 4:
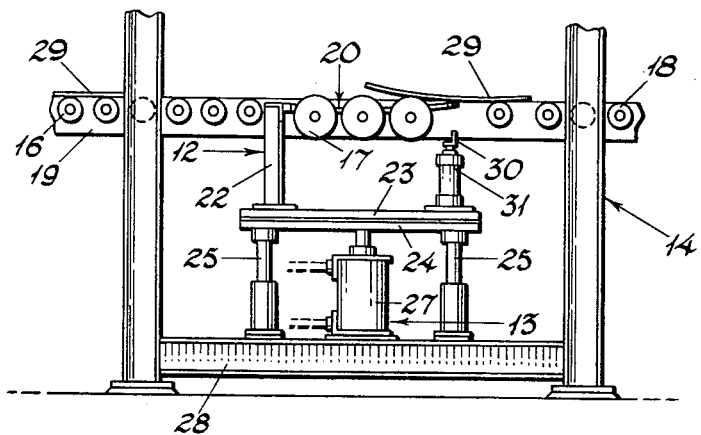
FIG. 4 is a fragmentary elevation view similar to FIG. 2, but depicting the bending apparatus after bending and tempering are completed.

Before the start of a bending cycle the normal position of the mold member 12 is as shown in FIGS. 1 and 4 with its shaping surface 21 below the supporting surface of the rolls 17. At this time pressure is applied to the lower ends of the stop cylinders 31 to put the stops 30 in position to engage the leading edge of a sheet entering the bending section. Through the use of well-known detection and timing devices, as soon as a sheet hits the stops 30 the rolls 17 are stopped and fluid pressure is applied to the lower end of the cylinder 27 causing the ram 26 to rapidly move the mold member 12 upward, lifting the sheet from the rolls 17. As the sheet is moved bodily upward by the mold combined inertial and gravitational forces, acting on the glass, cause it to sag into conformity with the shaping surface 21.

Figure 3:
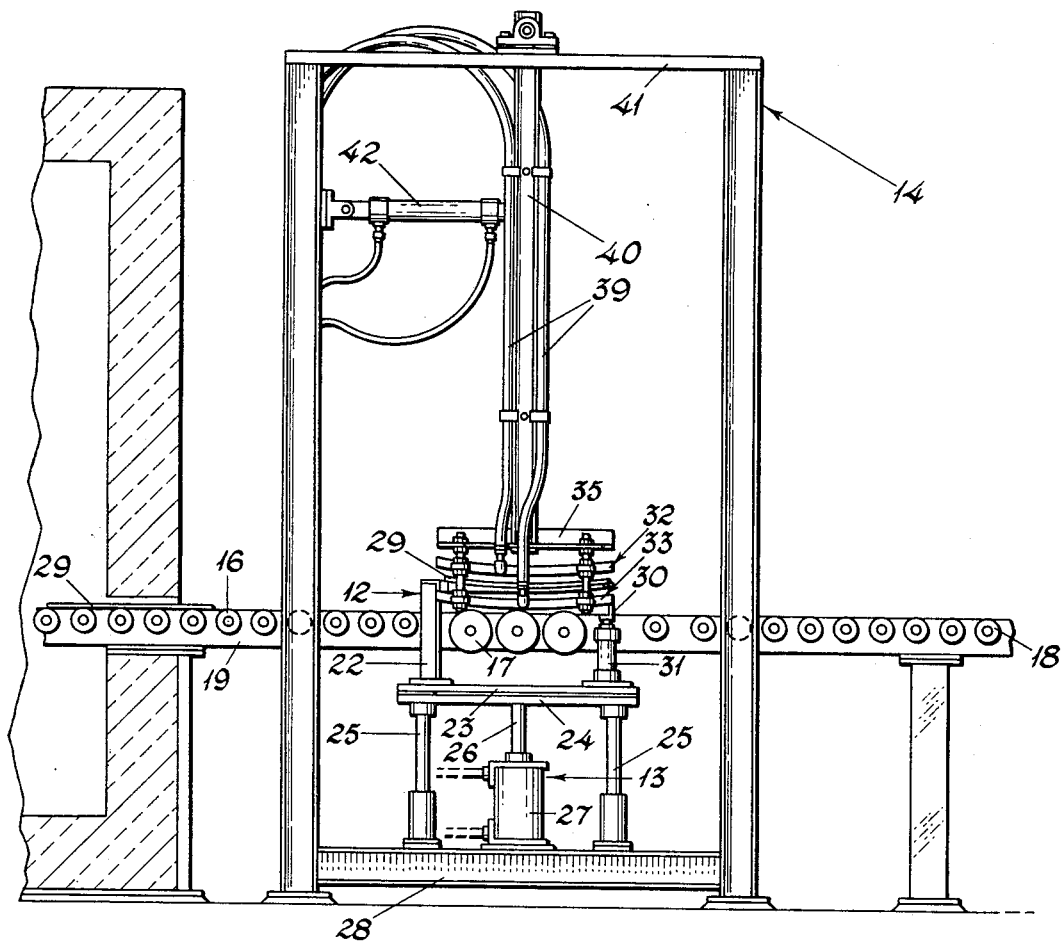
FIG. 3 is a side elevation view similar to FIG. 1 but showing the tempering blasthead assembly in operative position.

While the cantilevered mold member has sufficient rigidity to support the sheet unaided during this operation, according to one aspect of the invention the stops 30 are adapted to serve as additional supports during the acceleration of the sheet. As illustrated, the stop 30 is L-shaped in cross-section, with the vertical leg of the L extending upward beyond the shaping surface 21 to engage the leading edge of the sheet with the horizontal leg fitting under the end of mold member 12 to provide additional support. As illustrated in FIGS. 3 and 4 the stop 30 is retracted immediately after bending is completed to leave the end of the mold member open to allow for the movement of the tempering apparatus into operating position.

According to the invention, the mold member 12 is allowed to remain in its raised position immediately after bending and upper and lower cooling nozzle assemblies or blastheads 32 and 33 respectively, which constitute the tempering section C, are moved into position to apply cooling air simultaneously to the upper and lower surfaces of the bent sheet.

The individual blastheads 32 and 33 are fastened together to form an integral blasthead assembly and are held in spaced relationship by a plurality of adjustable support members 34 depending from mounting rails 35 (FIGS. 5–7). Referring to FIG. 8, each cooling nozzle assembly or blasthead comprises rows of spaced perforated tubes 36 extending between closed manifolds 37. Each blasthead is substantially identical except for the direction in which the perforations open. To obtain a better air distribution the rows of perforations can be staggered as shown.

At least one of each pair of manifolds is provided with an air inlet connection 38 for the passage of pressurized air from a suitable source (not shown) via flexible conduits 39. As illustrated, it is desirable to have each manifold follow the general contour of the mold member, although this is not absolutely essential since adjustments in air flow can be made to each manifold and to each tube if necessary.

To provide for movement of the blasthead assembly into tempering position the mounting rails 35 are attached to elongated arms 40 which are pivotally suspended from crossmembers 41 of the framework 14. While the arms can be moved manually, it is preferable to utilize an actuating mechanism such as the pressure cylinder 42 illustrated which can be controlled as a part of an automatic bending and tempering cycle.

Ideally, the blasthead assembly should be pivoted from a point corresponding to the center of curvature of the sheet, permitting uniform spacing of the tube assemblies from the sheet and uniform application of cooling air; however, assuming that clearance is available for the blastheads to be moved over the mold, some latitude is permitted with regard to the actual radius and the location of the pivot point, since some adjustments can be made to air flow rates to either sets of tubes and within the individual tubes to effectively obtain uniform cooling over both major surfaces of the sheet.

Upon completion of bending, with mold member 12 still in its fully extended position (FIG. 2), the stops are dropped to an out-of-the-way position and the blasthead assembly is swung into place as shown in FIG. 3. Air is then applier to the manifolds 37 where it flows into the tubes 36 and exits through the perforations to impinge against the upper and lower surfaces of the bent sheet. Once the sheet is cooled to below the annealing range of the glass the blastheads are swung away from the mold and the conveyor rolls 17 are restarted to send the sheets on their way to further processing on exit rolls 18 (FIG. 4).

Since the blasthead assembly is stationary when the tempering air is applied to the sheet the air emanating from the perforations tends to impinge against the sheet in a pattern of dots rather than being evenly distributed across the sheets. If the air pressure is high enough this can actually cause dimpling of the sheet. To obviate this problem, means are provided to oscillate the blasthead assembly in a horizontal plane, causing the perforations to move in a circular path. As a result, the air impinges against the sheet in a pattern of closely spaced or overlapping circles, and a more nearly uniform tempering pattern is obtained.

In the illustrative embodiment, the ocisllating means, designated by the numeral 43, comprises a weight 44 rotated about a vertical axis spaced from its center of mass, by an air motor 45 mounted on the blasthead assembly above the upper blasthead 32. As the unbalanced weight oscillates about its axis, the blasthead assembly oscillates in the opposite direction about the same axis. The long arms 40 permit sufficient oscillation to eliminate the concentration of tempering air in a finite dot pattern.

I claim:

1. In apparatus for bending and tempering glass sheets, including a horizontal conveyor system for supporting flat and bent glass sheets in and moving them along a predetermined path, an open ring type bending mold having a contoured shaping surface, means mounting said mold for movement relative to said path, and means for moving said mold vertically between a lowered position below said path and a raised position thereabove to lift a heated flat glass sheet from said conveyor system at a speed sufficient to cause said sheet to bend by inertia and gravity into contact with said shaping surface and to subsequently lower the bent sheet to return the same to said path for continued movement therealong; the improvement in which said mounting means includes means for supporting said mold as a cantilever from one side thereof, and there are provided upper and lower chilling means designed to direct streams of cooling fluid to impinge against opposite surfaces of a bent glass sheet on said cantilever mold when said chilling means are in operative position on opposite sides thereof, means for moving said chilling means from an inoperative position out of the path of travel of said sheet and at a side of said mold away from said supported side into said operative position in a direction leading from an unsupported toward the supported side of said mold.

2. Apparatus for bending and tempering glass sheets as claimed in claim 1, including means attaching said upper and lower stream directing means together to form a blasthead assembly; an elongated support member from which said assembly is suspended, said elongated support member being pivotally mounted above said mold member; and means for moving said assembly along an arcuate path from its inoperative to its operative position.

3. Apparatus for bending and tempering glass sheets as claimed in claim 1, including means for bracing the unsupported portion of said mold member during bending, said bracing means comprising one or more vertical support members engageable with the undersurface of said mold member, means mounting said support members for simultaneous movement with said mold member, means mounting said support members for movement toward and away from said undersurface, and means for selectively moving said support members into engagement with said mold member before a sheet is bent thereon and out of engagement therewith after a sheet is bent thereon.

References Cited
UNITED STATES PATENTS 3,468,645    9/1969    McMaster et al. _____ 65—114 X ARTHUR D. KELLOGG, Primary Examiner U.S. Cl. X.R.

65—273, 104, 351